Feb. 10, 1970     R. SCHOENFELD     3,494,213

CHAIN SAW SPROCKET

Filed Aug. 28, 1967

INVENTOR
Robert Schoenfeld
BY Kimmel, Crowell & Weaver
ATTORNEYS

United States Patent Office 3,494,213
Patented Feb. 10, 1970

3,494,213
CHAIN SAW SPROCKET
Robert Schoenfeld, 4614 Lyons Road,
Austin, Tex. 78702
Filed Aug. 28, 1967, Ser. No. 663,585
Int. Cl. F16h 55/30
U.S. Cl. 74—243                                      6 Claims

ABSTRACT OF THE DISCLOSURE

A chain saw and a sprocket for chain saws wherein the sprocket comprises a sleeve for securing the sprocket to a shaft, a disc with fans therein for impelling air, a plurality of removable teeth which provide four wearing surfaces thereon and means for holding the teeth for easy removal and reversal to provide wear on any of the four wear surfaces and retaining means are disclosed.

BACKGROUND OF THE INVENTION

Field of the invention

This invention relates to chain saws and more particularly to chain saw sprockets.

Description of the prior art

Sprockets which have a combined fan or air impeller therewith are known. Such devices are disclosed in United States Patents 1,808,240, 2,746,587 and 2,989,995. Sprockets are also known which include replaceable teeth. Such sprockets are described in United States Patents 655,943 and 2,884,798. However, such sprockets are frequently expensive to make and have only limited utility and applicability because of the difficulty in utilizing them and in changing the removable teeth in the sprocket housing.

Chain saws are common articles of commerce and are conventionally provided with some type of sprocket, as shown in United States Patents 2,884,798 and 3,183,948. Heretofore, however, a sprocket which is both an air impeller for cooling a clutch, a chain, and removing sawdust from the chain coupled with a sprocket wherein removable teeth may be reversed for permitting wear on a plurality of surfaces are not known. It is, accordingly, an object of this invention to provide an improved chain saw wherein the improvement is a specially designed and improved sprocket which includes air power means and removable teeth which may be reversed to provide for wear on four surfaces thereof.

SUMMARY

Briefly, and without intending to limit the scope of the invention, this sprocket described herein comprises a cylindrical sleeve for receiving a rotatable shaft, a disc secured to one end of the sleeve, air impelling fans on the disc, a pair of spaced disc members, one of which has slots therethrough, spacers for positioning the discs on the cylindrical sleeve, a plurality of reversible removable teeth for being received through the slots in one of the disc members and for forming chain engaging and driving means and a retainer for the teeth are disclosed. It is, accordingly, an object of this invention to provide an improved sprocket for chain saws.

A more specific object of the invention is the provision of a combined sprocket having air impelling means and removable chain engaging means.

An additional object is the provision of a sprocket which has chain engaging teeth which are reversible to provide for wear surfaces on a single tooth.

The specific construction of the sprocket as shown in the drawing and as described in greater detail hereinafter comprises a further and more specific object of the present invention.

DESCRIPTION OF THE PREFERRED EMBODIMENT

Figure 1:
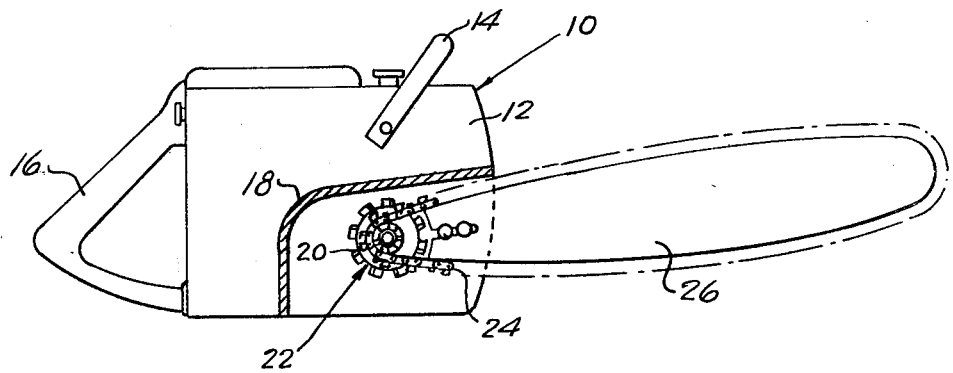
FIGURE 1 is a side view of the chain saw of this invention showing the improved sprocket in position.

As best shown in FIGURE 1, chain saw 10 of this invention comprises the conventional housing 12 and a top handle 14 and a rear handle 16 according to conventional practice. The housing 12 includes a motor which is not shown for clarity of illustration. The motor, the housing, and the overall construction of the chain saw may be according to conventional practice. A guard 18 is provided on the housing 12 to prevent accidental injury by contact with the chain driving mechanism which includes a shaft 20 which is rotatably driven by the motor according to conventional practice. The drive mechanism also includes a sprocket 22 which engages chain 24 and carries thereon cutting teeth or edges. The chain 24 is guided by a support 26 according to conventional practice.

Figure 4:
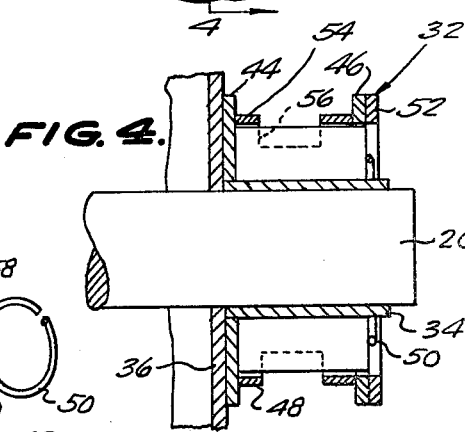
FIGURE 4 is a cross-sectional view taken substantially along lines 4—4 in the direction of the arrows as shown in FIGURE 3 showing the assembly of the sprocket and the removable reversible teeth in greater detail.

As shown in FIGURES 2, 3, 4 and 5, the sprockets of this invention comprises air impelling means shown at 30 and chain engaging and driving means shown at 32, as well as a means shown at 34 for securing the sprocket to the rotatable shaft 20, as best shown in FIGURE 4.

The air impelling means 30 comprise a disc 32 secured to the mounting means 34 which is preferably a cylindrical sleeve. The air impelling means also comprises a lip or flange 38 which carries a multiplicity of air impelling fans 40 thereon. The fans impel the air toward the saw and, if desired, toward a clutch or other mechanism for providing cooling and removing sawdust from the saw.

Figure 2:
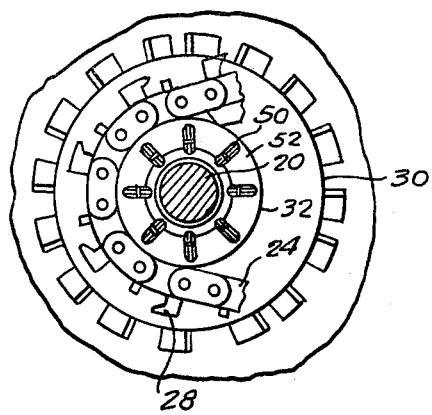
FIGURE 2 is an enlarged side view of the sprocket of this invention.
Figure 3:
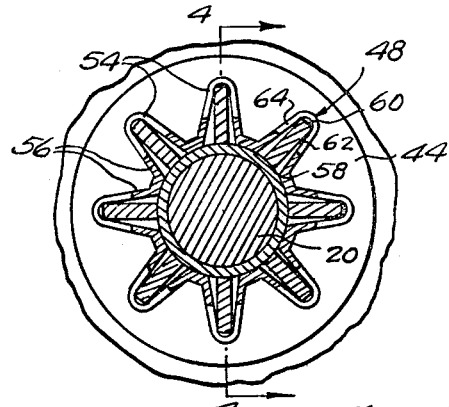
FIGURE 3 is a side view in partial cross-section taken approximately at the center of the sprocket.

The chain is driven by a plurality of removable teeth shown at 42. The teeth 42 are held between spaced disc members 44 and 46 which are held in their spaced relationship by a securing means 48 which also receives the removable teeth 40 and confines them to a generally circular configuration. The removable teeth 42 are held in place by a retaining ring 50 which is received in a slot between disc 46 and a retaining disc 52, best shown in FIGURE 4. Both the disc 46 and the retaining disc 52 are provided with slots for receiving the removable teeth 42 when they are inserted for use. As shown in FIGURE 2, the retainer 50 is held behind fingers in disc 52 which are formed by the slots therethrough. The disc 52 is welded, braced, or otherwise secured to the disc 46 or may be formed integrally therewith according to the most convenient means of manufacture.

The spacing and securing means 48 comprise a plurality of engaging portions 54 at each end thereof and openings 56 through which the teeth may protrude in the circular configuration.

Figure 5:
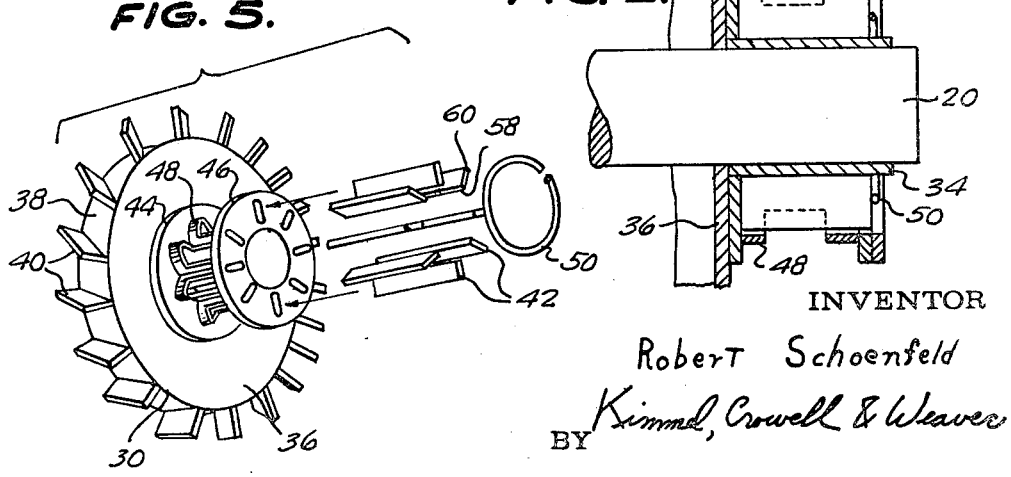
FIGURE 5 is an exploded view showing the manner of assembly and disassembly of the sprocket and removal and insertion of the removable teeth in the sprocket.

In use, the individual teeth are pushed through the slots in the disc 46 and retained in place by the ring 50. Each of the teeth is generally flat and regular in configuration. Preferably, the configuration is that of a rectangle, as shown in FIGURE 5. However, it would be possible to make the teeth square and thus provide eight wear surfaces rather than four as are provided hereinafter, but it has been found most convenient to make the teeth rectangular to provide four conveniently usable wear surfaces rather than eight. Each of the teeth is substantially flat and has first and second wear edges which may be the interior and exterior edges shown at 58 and 60 and first and second sides shown at 62 and 64, most clearly in FIGURE 3. It will be seen that since the sprocket rotates in only one direction wear will be concentrated, in the configuration shown in FIGURE 3, about the wear edge 60 and the wear side 64. By pulling the tooth out and turning it end-for-end the wear will be concentrated, again, adjacent wear edge 60 but on side 62. Two additional wear surfaces may be provided by turning the inside 58 to the outside and by turning the tooth end-for-end as described.

Thus, by single simple construction four wear surfaces may be provided which will very substantially increase the utility and the life of the sprocket. A further factor which is important is to consider that such wear surfaces may further increase the life of the chain since the teeth may be made of a medium tempered steel. By making the teeth of a medium tempered steel, which tends to wear more rapidly than the chain, wear on the more expensive chain is reduced and the inexpensive teeth may be replaced or their position reversed as necessary. Considerable economy is achieved by the very significant increase in the life of the chain.

By combining these advantages with the air impelling means on the sprocket, very substantially increased wear and greater efficiency is achieved.

Variations from the exact configuration disclosed may be made without departing from the invention. For example, the means for holding the teeth in, while found most advantageous in practice, may be altered so long as the essential function is retained; i.e., the position of regularly shaped teeth in a circular configuration. In addition, the shape of the teeth may be altered since all that it requires is that they be generally flat and regular in configuration. Actually, it is not necessary that they be exactly flat and it may be desirable to provide some degree of curvature according to the specific requirements and needs. The teeth, as previously mentioned, may if desired be square to provide additional wear surfaces or may be of some other regular shape to permit reversible use.

Thus is will be seen that a highly advantageous and greatly improved sprocket for chain saws has been disclosed and that departures from the abstract, summary and the disclosure may be made without departing from the spirit of the invention.

I claim:

1. A sprocket adapted for use on chain saws comprising:

a support sleeve for receiving a rotatable shaft;

means on the support sleeve for supporting removable teeth in a generally circular configuration;

a plurality of teeth for being supported in circular configuration;

means for selectively retaining said teeth in said configuration and for permitting removal of said teeth;

said teeth having at least two chain engaging surfaces and being reversible for permitting engagement of the chain by any of said surfaces; and said teeth individually comprise:

a generally flat regularly shaped member having at least first and second engaging edges and first and second engaging sides for thereby providing at least four engaging surfaces, two of said surfaces being adjacent said first edge and two of said surfaces being adjacent said second edge.

2. The sprocket of claim 1 wherein the retaining means comprises:

a pair of spaced discs, one of said discs having a plurality of slots therethrough for permitting passage of said teeth therethrough;

means securing the spaced discs in said relationship and holding said teeth in chain engaging position; and means for selectively retaining the teeth in said chain engaging position.

3. The sprocket of claim 2 further comprising:

air impelling means on the support sleeve for blowing sawdust from a chain or the like and for providing cooling.

4. The sprocket of claim 3 wherein the air impelling means comprises:

a disc on the support member; and a multiplicity of air impelling fans on the periphery of the disc.

5. The sprocket of claim 1 further comprising:

air impelling means on the support sleeve for blowing sawdust from a chain or the like and for providing cooling.

6. The sprocket of claim 5 wherein the air impelling means comprises:

a disc on the support member; and a multiplicity of air impelling fans on the periphery of the disc.

References Cited

UNITED STATES PATENTS

| 655,943 | 8/1900 | Williamson | 74—243 |
|---|---|---|---|
| 1,630,313 | 5/1927 | Rorabeck | 74—243 |
| 2,184,461 | 12/1939 | Mall | 143—32 |

DONALD R. SCHRAN, Primary Examiner

U.S. Cl. X.R.

143—32